United States Patent Office 3,140,747
Patented July 14, 1964

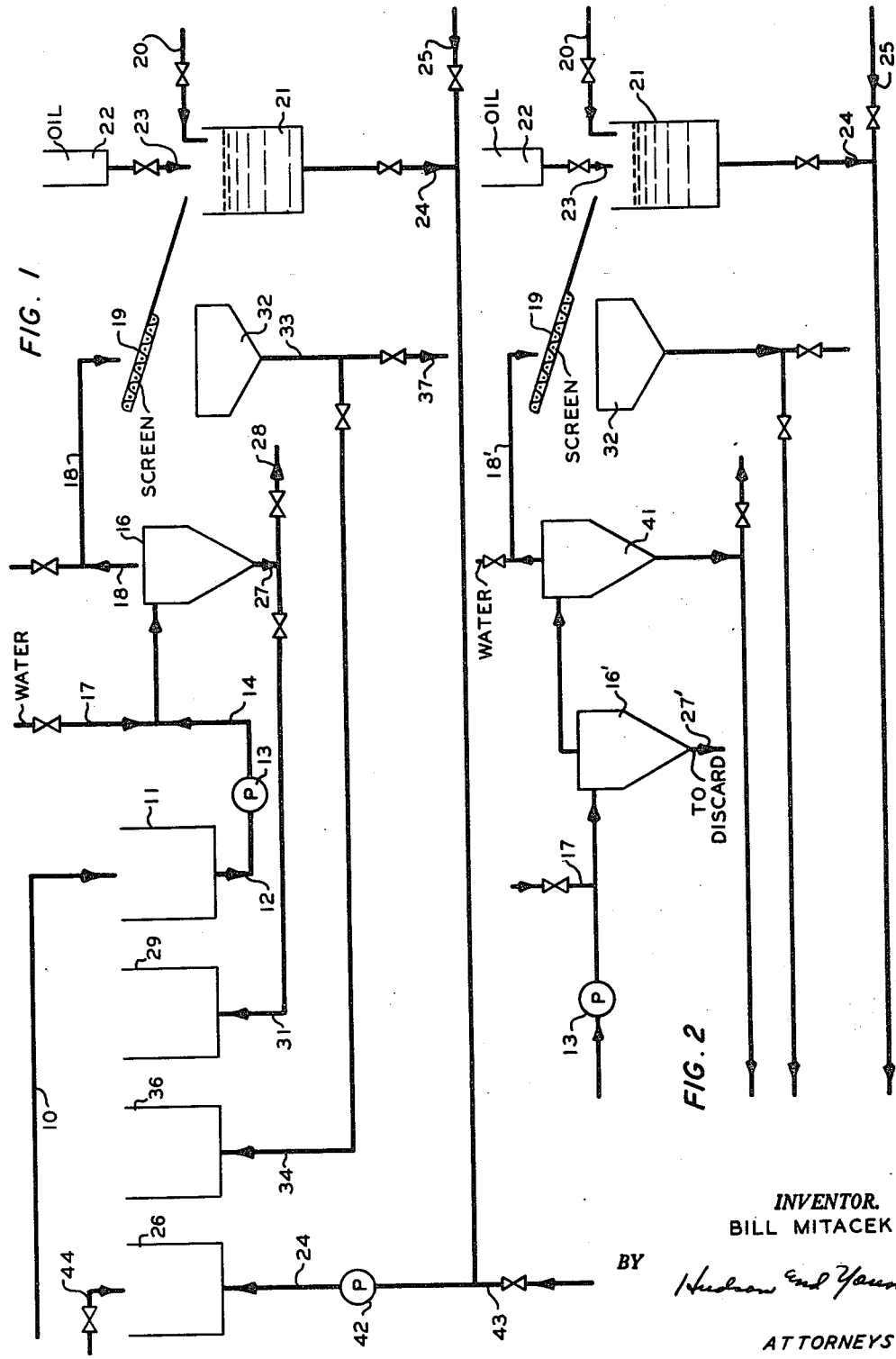

3,140,747
WATER-IN-OIL EMULSION WELL FLUID
Bill Mitacek, Bartlesville, Okla., assignor to Phillips Petroleum Company, a corporation of Delaware
Filed July 27, 1960, Ser. No. 45,699
21 Claims. (Cl. 175—66)

This invention relates to a well servicing fluid of the water-in-oil emulsion type. In one aspect this invention relates to a well servicing fluid of the water-in-oil emulsion type which is suitable for use in the drilling, completion, or workover of wells. In another aspect this invention relates to methods for using said well servicing fluids in the drilling and servicing of wells.

In the art of drilling wells to tap subterranean deposits of fluids such as oil and/or gas, especially when drilling by the rotary method employing a rotary bit and drill stem, a compounded drilling fluid made to predetermined physical and chemical properties is circulated to the bottom of the bore hole, out through openings in the bit at the bottom of the bore hole, and then back up said bore hole to the surface by passage through the annular space between said drill stem and the wall of said bore hole (or between said drill stem and the wall of the casing where casing has been put in place).

The especially prepared drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; it must serve as a weighting material exerting sufficient pressure to counterbalance any pressure exerted by water, gas, oil, or other fluid from a penetrated structure and to prevent caving or other intrusion into the drill hole.

Said drilling fluid must also serve as a lubricant for the bearings of the drill bit and the cutting surface of the bit teeth, and to reduce frictional forces on the drill pipe.

These requirements have been met in the past by employing both aqueous and non-aqueous, or oil-base drilling fluids. The aqueous drilling fluids usually comprise water, colloidal material of both gel-forming and non-gel-forming types, and weighting materials suspended in the water. The non-aqueous, or oil-base drilling fluids, normally consist of a non-aqueous liquid such as crude oil or a petroleum distillate, and a weighting material. Sometimes these oil-base drilling fluids contain a minimum amount of water, e.g., less than 10 percent water. In addition to aqueous and non-aqueous drilling fluids, emulsion-type drilling fluids are often used. These emulsion drilling fluids consist of a substantially water-insoluble liquid such as oil, a weighting material such as clay, and water, together with a suitable dispersing or emulsifying agent. The two types of emulsion drilling fluids are the oil-in-water emulsion-type and the water-in-oil emulsion type. In the former, water or brine forms the contiuous phase of the emulsion, and in the latter oil forms the continuous phase of the emulsion. It is the water-in-oil emulsion type drilling fluids with which this invention is concerned.

Water-in-oil emulsion well servicing fluids are becoming increasingly popular for drilling into producing formations, for workover operations, and for drilling through salt formations and other instances where it is desirable to avoid exposing the formation to water as the continuous phase of said drilling or well servicing fluid.

One of the most important properties of a well servicing or drilling fluid is that it must possess a low fluid loss, particularly a low water loss. Low water loss drilling fluids permit drilling into heaving shale or similar formations without causing such shale to swell and cave into the bore hole. Low water loss drilling fluids also prevent decreases in permeability due to water blocking of pore space. Low fluid loss water-in-oil emulsion-type drilling fluids are particularly advantageous since the oil, being the continuous phase, protects the formation from the water contained in said drilling fluid.

Another important property which a drilling fluid should possess is that of lubrication. In recent years increased emphasis has been placed upon this property. A substantial portion of the drilling time consumed during the drilling of a well is taken up in replacing drill bits. The amount of time consumed during drilling operations in replacing drill bits increases roughly in proportion to the depth drilled because, in order to replace a bit the entire drill string must be removed, the bit replaced, and the entire drill string then rerun. Furthermore, each time circulation of the drilling fluid is stopped and the drill string pulled, the likelihood of a cave-in is increased. Past experience has shown that the most important factor in shortening the life of a drill bit is failure of the bit bearings. Such bearing failures frequently occur long before the cutting teeth are worn to such an extent as to require replacement of the bit. Thus, conventional prior art drilling fluids are obviously lacking in adequate lubrication properties insofar as the bearings of the bit are concerned.

It is also important to reduce the frictional forces on the drill pipe. There exists considerable torque on said drill pipe due to the friction between the outside of the drill pipe and the wall of the well, whether said well is represented by casing, open hole, cement, or other materials. A drilling fluid possessing enhanced lubrication properties will minimize said frictional forces.

I have now discovered that water-in-oil emulsion-type drilling fluids can be made to possess improved fluid loss properties and enhanced lubricating properties by dispersing therein a polymer selected from the group consisting of polyethylene, polypropylene, copolymers of ethylene and propylene, and mixtures thereof. Said drilling fluid also contains a water soluble stabilizing agent, and an oil soluble dispersing agent. Thus, broadly speaking, the present invention resides in a water-in-oil emulsion-type well servicing or drilling fluid containing a water soluble stabilizing agent, a polymer selected from the group consisting of polyethylene, polypropylene, copolymers or ethylene and propylene, and mixtures thereof, and an oil soluble dispersing agent.

An object of this invention is to provide an improved well servicing fluid. Another object of this invention is to provide an improved drilling fluid having improved fluid loss properties and enhanced lubricating properties, as well as other desirable drilling fluid properties. Another object of this invention is to provide methods of using said improved well servicing or drilling fluid in the drilling or workover of wells. Another object of this invention is to provide a method of drilling or completing a well in which method a water-in-oil emulsion-type well servicing fluid of the invention is circulated in said well. Other aspects, objects, and advantages of the invention will be apparent to those skilled in the art in view of this disclosure.

Thus, according to the invention, there is provided an improved well servicing fluid comprising a water-in-oil emulsion containing a water soluble stabilizing agent, a polymer selected from the group consisting of polyethylene, polypropylene, copolymers of ethylene and propylene, and mixtures thereof, and an oil soluble dispersing agent for dispersing said polymer in the oil phase of said emulsion.

Further according to the invention, there are provided methods of using the water-in-oil emulsion-type well servicing fluids of the invention, which methods comprise circulating said well servicing fluids into and from the bore hole in contact with the walls of said bore hole.

In a presently preferred embodiment of the invention the water-in-oil emulsion-type well servicing fluids of the invention also contain a small amount of finely divided solids suspended therein.

The polymers employed in the practice of the invention are prepared by polymerization of 1-olefins and are normally insoluble in the oil phase of the well servicing fluid. By "normally insoluble" is is meant that said polymers are not significantly soluble in said oil phase at temperature below about 160° F., and are completely or nearly completely soluble in said oil phase at higher temperatures, e.g., at temperatures in the range of about 250 to 400° F. Thus, said polymers are characterized by a cloud point above about 160° F. Examples of suitable polymers which can be used in the practice of the invention are the homopolymers of ethylene, the homopolymers of propylene, and copolymers formed by copolymerization of a major amount of ethylene with a minor amount of propylene. In general, in said copolymers ethylene preferably makes up at least 95 weight percent of the copolymer. In forming such a copolymer the monomer fed to the polymerization zone will ordinarily be at least about 80 weight percent ethylene. As the percent of ethylene in the copolymer is decreased, the density of said copolymer also decreases so that the value of the density can be used as an indication of the copolymer composition.

One presently preferred method for preparing said polymers which can be used in the practice of the invention is that described in U.S. Patent 2,825,721 issued March 4, 1958 to J. P. Hogan et al. The presently most preferred polymers for use in the practice of the invention are those having a density in the range of about 0.94 to about 1 gram per cubic centimeter at 25° C. (77° F.), a crystallinity as measured by nuclear magnetic resonance of at least 70 percent, an average molecular weight in the range of about 10,000 to about 300,000, and a melt index within the range of 0.1 to 25, preferably between 1 and 6. Said preferred polymers can be prepared by the method of said Patent 2,825,721. Polymers prepared in accordance with the method of said patent are available commercially under the trademark Marlex. In testing said polymers the melt index is determined by ASTM Method D-1238-57T except that five cuts are made and an average of these is determined. The density of said polymers is determined in accordance with ASTM Method D-1505-57T. In density determinations the specimens should be prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature.

The molecular weight as used herein is determined as follows:

The molecular weight determination is based upon a measurement of the intrinsic viscosity of the polyethylene. The intrinsic viscosity is determined by measuring the time required for a filtered solution of 0.1000 gram of the polyethylene in 50 ml. of tetralin (measured at room temperature, i.e., about 75° F.) to run through the marked length on a size 50 (0.8–3.0 centistokes) Ostwald-Fenske viscosimeter at a temperature of 130° C. (the viscosimeter being immersed in a thermostatically controlled oil bath) and measuring also the time required for an equal volume of tetralin containing no polyethylene to run through the same distance on the same viscosimeter. The molecular weight is calculated in accordance with the following formula:

$$M_w = \frac{K 2.303 \log Vr}{C}$$

where $K=24,450$
$C=0.183$
$Vr=$ time, in seconds, required for solution to run through viscosimeter divided by the corresponding time required for the polymer-free tetralin, both at 130° C.

A single determination of molecular weight ordinarily has a precision of ±1000 molecular weight units.

The invention is not limited to using polymers prepared according to the process of said Patent 2,825,721. Suitable polymers can be prepared using other processes, for example processes which employ what are commercially known as organometallic catalyst systems. One such system comprises using a catalyst comprising an alkyl aluminum, such as triethylaluminum, and a reducible metal halide such as titanium tetrachloride. Other processes known to those skilled in the art, such as the high pressure processes, can be used to prepare polymers which can be used in the practice of the invention. Polymers having densities as low as about 0.88 g./cc. at 25° C. can be used in the practice of the invention.

The amount of said polmers used in the practice of the invention will vary from well to well and the optimum amount can be readily determined under any given set of conditions by withdrawing a portion of the well servicing or drilling fluid and testing it with various amounts of the particular polymer to be dispersed therein. Thus, one can determine the exact amount necessary to yield the desired properties in a drilling fluid and can avoid the use of costly excessive amounts. While, therefore, the amount of polymer used is not of the essence of the invention, it can be stated that the amount of said polymer will normally be within the range of about 0.45 to about 19 weight percent of the total composition and, usually for most purposes within the more restricted range of about 1 to about 8 weight percent.

As pointed out above, it is usually preferred that the well servicing or drilling fluids of the invention contain relatively small amounts of finely divided solids. Said solids increase the visocsity and afford plastering properties to said fluids by aiding in forming a filter cake on the wall of the bore hole and thus aid in reducing fluid loss to the formations penetrated by the well. While the presence of said solids is desirable initially, it should be pointed out that the water-in-oil emulsion drilling fluids of the invention are operable without said solids and that a certain solids content will develop after a period of drilling. The finely divided solids used in the practice of the invention should be insoluble in the oil phase as well as insoluble in the water phase so that they will remain undissolved over long periods of time. Examples of finely divided solids suitable for use in the practice of the invention include, among others, the following: bentonite, ground limestone, barites, ground oyster shells, diatomaceous earth, fuller's earth, kaolin, atapulgite, and other native clays. Mixtures of two or more of said finely divided solids can also be used. All of said materials should be ground until at least about 90 percent will pass through a 325-mesh screen. The amount of said finely divided solids used in the practice of the invention is usually within the range of 0 to about 2.5 weight percent, preferably about 1 to about 2 weight percent.

Any suitable water soluble stabilizing agent can be used in the practice of the invention. A great number of such materials are well known to those skilled in the art. Although certain water soluble stabilizing agents are set forth herein as being presently preferred, the invention is not to be limited to any particular water soluble stabilizing agent or class of water soluble stabilizing agents.

In the practice of my invention I prefer to use the sodium, potassium or the lithium salt of carboxymethylcellulose as the water soluble stabilizing agent. While the other alkali metal salts of this cellulosic compound work equally well, I prefer to use those mentioned for economic reasons.

Sodium carboxymethylcellulose (also called sodium carboxymethylcellulose ether or carboxymethylcellulose ether) may be obtained and used as such, or the free acid, carboxymethylcellulose, may be obtained and converted to the sodium salt by neutralization of the free acid with, for example, an aqueous solution of sodium hydroxide. Carboxymethylcellulose, as its name implies, is methylcellulose which has substituted in the methyl group, a carboxyl group, and will hereinafter be designated as CMC except in the claims.

Other cellulosic derivatives having carboxyl groups or soluble salts of these may be employed as substitutes for the sodium-CMC. Among such compounds may be mentioned salts of oxidized cellulose, which oxidized cellulose base material is an oxidation product of nitrogen dioxide ($NO_2$ or $N_2O_4$) and cellulose linters; and alkali metal salts of carboxymethoxymethylcellulose

in which R is a glucose unit of the cellulose, or alkali metal salts of carboxymethylcellulose xanthate.

The CMC of commerce is often made for sale in three grades according to viscosity properties imparted by the sodium salt of said CMC to water in which it is dissolved, viz., low, medium, and high viscosity. The viscosity properties of the medium viscosity product are usually lower than the means of the viscosities of the high and low viscosity products, conditions being equal.

The letters CEC are used herein to indicate the chemical name "carboxyethyl cellulose" (also called carboxyethyl cellulose or carboxyethyl celluose ether); and accordingy, sodium CEC refers to the sodium salt of carboxy ethyl cellulose ether. This compound can be represented by the following formula:

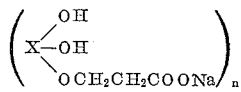

wherein X represents the glucose residue, $C_6H_7O_2$. Similarly, sodium CMC would have the formula

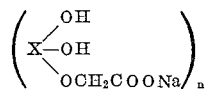

Other water soluble stabilizing agents which can be used in the practice of the invention include among others, the following: starch, natural gums such as gum arabic, karaya, tragacanth, hydrolyzed polyacylonitrile and other cellulosic derivatives. Mixtures of one or more of the above described water soluble stabilizing agents can be used as desired.

Any suitable oil soluble dispersing agent can be used in the practice of the invention for maintaining the above described polymers dispersed in the oil phase of the water-in-oil emulsion well servicing fluids of the invention. The line of demarcation between dispersing agents which can be called "oil soluble" and dispersing agents which can be called "oil dispersible" is not distinct. However, either type can be used in the practice of the invention. Thus, herein and in the claims, unless otherwise specified, the term "oil soluble" is used generically and includes those dispersing agents which are sufficiently oil dispersible to permit maintaining the desired concentration of the dissolved or dispersed dispersing agent permanently in the oil phase. Many examples of such oil soluble dispersing agents are known to those skilled in the art.

One class of oil soluble dispersing agents which is presently preferred in the practice of the invention is the salts of the oil soluble petroleum sulfonic acids. Said sulfonic acids can be prepared by the sulfonation of various hydrocarbon oils. Several suitable sulfonation processes have been described in the literature. Some preferred hydrocarbon sulfonic acids are prepared by sulfonation of a high molecular high paraffinic lube oil friction with a sulfonation agent consisting essentially of sulphur trioxide dissolved in sulphur dioxide. The recovered sulfonic acids are then converted to the ammonium, alkali metal, or alkaline earth metal salts. The ammonium, sodium, calcium, and barium salts are illustrative of suitable salts which can be used in the practice of the invention.

For example, the calcium sulfonate which was employed in the following Example I was prepared in the following manner. A commercial, solvent refined oil of a highly paraffinic type was treated with a solution of liquid $SO_3$ in liquid $SO_2$. The paraffin base oil had a SUS viscosity at 100° F. of 4130, a SUS at 210° F. of 209.3, a viscosity index of 97, a neutralization number of 0.00, a Conradson carbon content of 0.9 percent, an API gravity at 60° F. of 25.0, a flash point of 615° F. and a pour point of +15° F. The stock was treated with liquid $SO_3$ and liquid $SO_2$ at approximately 110° F., following which diluent naphtha was injected into the treated material and said treated material was then neutralized with an aqueous slurry of lime. The resulting mixture was then stabilized by heating to 360° F., following which the water was stripped off, the solids were filtered out, and finally the diluent naphtha was stripped off. The acid-oil ratio during the sulfonation was 0.08 The resulting calcium sulfonate had an ash content of 4.67 percent a base number of 8.0, a sulfonate content of 0.51 milliequivalents per gram, an SUS viscosity at 210° F. of 1487, a Penske-Martin flash point of 605° F. and contained no centrifugible solids.

Still another class of oil soluble dispersants is the oil soluble ploymers prepared by polymerization of alkylacrylate esters. The well-known "Acryloid" type of polymers is illustrative of this class of dispersants. They represent polymers of the esters of methacrylic acid and higher fatty alcohols such as lauryl alcohol. Polymers are also made with the acrylate and alkylacrylate esters by copolymerization with monomers such as vinylpyrrolidine, styrene, vinyl acetate, vinyl isobutyl ether, and the like. Methods for preparing these polymers have been described in the literature, e.g. by Riddle, "Monomeric Acrylate Esters," Reinhold Publishing Corp., New York (1954).

One particularly suitable dispersant represents a copolymer of vinylpyrrolidone having the structure

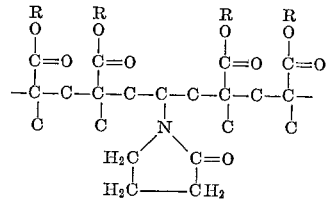

where R represents an alkyl group having 1 to 24 carbon atoms, such as methyl, butyl, hexyl, octyl, decyl, dodecyl, tridecyl, pentadecyl, hexadecyl, heptadecyl, octadecyl, eicosanyl, and tetracosanyl.

In general, there are three classes of oil soluble dispersing agents, i.e., cationic, anionic, and nonionic. Regardless of the type, an oil soluble dispersing agent will have a hydrophobic (oil soluble) group and a hydrophylic (water soluble) group. For a dispersing agent to be of the oil soluble type the size of the hydrophobic group must be relatively large with respect to the size of the hydrophylic group. Thus, some examples of oil soluble dispersing agents other than those named above which can be used in the practice of the invention are the quaternary amines, esters of sulfonated aliphatic acids, esters of polyhydric alcohols, and condensation products of alkylphenols with alkylene oxides wherein the number of mols of alkylene oxide employed is relatively small. More specifically, cationic oil dispersing agents such as N-2-hydroxyethyl-tert-octadecylamine, anionic oil soluble dispersing agents such as dioctyl sodium sulfosuccinate (Triton GR-7), and nonionic oil soluble dispersing agents such as propylene glycol monolaurate, glyceryl monoleate, glyceryl monolaurate, and diethylene glycol monolaurate can be used.

The oils used in the practice of the invention are usually petroleum oils, although other oleaginous materials such as vegetable and animal oils can be used, though seldom with economic advantage. The oils in any event should contain at least some material boiling above the gasoline boiling range, i.e., above about 400° F. at atmospheric pressure. Oils with too high a content of highly volatile hydrocarbons in the gasoline boiling range are undesirable because of the danger of fire, and because of the low viscosity. It is preferred that the oil have a flash point above 140° F. Examples of suitable oils which can be employed in the practice of the invention include, among others, the following: topped crude oil, gas oils, kerosene, diesel fuels, heavy alkylates, fractions of heavy alkylates, and the like. The more preferred oils are predominantly paraffinic in character since these are less detrimental to rubber components in pumps, lines, etc., and also because the polymers have a somewhat higher cloud point with the more paraffinic oils. It is preferred that the oil have a gravity within the range of 15-40° API.

From the above it is seen that a general formula for the drilling fluids of the invention can be set forth as follows:

TABLE

| Ingredient | Concentration, Weight Percent | |
|---|---|---|
| | Broad Range | Preferred Range |
| 1. Water | 9-45 | 20-42 |
| 2. Water soluble stabilizing agent | 0.005-0.13 | |
| 3. Finely divided solids | 0-2.5 | 1-2 |
| 4. Oil | 42-89 | 55-80 |
| 5. Polymer | 0.45-19 | 1-8 |
| 6. Oil soluble dispersing agent | 0.3-3 | |

Generally, the oil phase will be the major portion and the water phase the minor portion of the drilling fluids of the invention. It is preferred that the total of ingredients 1, 2, and 3 given above be at least 10 weight percent and not more than 45 weight percent; and that the total of ingredients 4, 5, and 6 be at least 55 weight percent and not more than 90 weight percent.

In the preparation of the drilling fluids of the invention it is preferred to first separately form the water phase by adding the water soluble stabilizing agent and the finely divided solids component (when finely divided solids are included) to the required amount of water. One convenient method used by those skilled in the art for measuring the ingredients is to express the amount in terms of pounds per barrel. Thus, in preparing the water phase the amount of water soluble stabilizer added to the water can be in the range of from about 0.2 to 1 pound of said stabilizer per barrel of water, and the amount of finely divided solids can be in the range of about 3.5 to about 18.5 pounds of solids per barrel of water. The oil phase is prepared separately from the water phase. In the preparation of said oil phase, from about 3 to about 76.5 pounds of the desired polymer is used per barrel of oil, and the oil is then heated to a temperature in the range of about 250 to about 400° F. to dissolve said polymer. The solution is then cooled, preferably at a rate not greater than about 20° per minute, until the temperature is sufficiently low to precipitate substantially all of the polymer as a colloidal dispersion or sol of said polymer in said oil. Preferably the oil is cooled to a temperature below about 150° to effect said precipitation. The oil soluble dispersing agent in an amount of from about 2.5 to 10 pounds per barrel of oil is then added to the thus formed dispersion of polymer in oil. If desired, said oil soluble dispersing agent can be added to the oil prior to addition of the polymer. The water phase is then added to the thus prepared oil phase and the two phases intimately mixed to form the final water-in-oil emulsion well servicing fluid of the invention.

By dissolving the polymer in the oil and then slowly cooling the resulting solution to a temperature sufficiently low to precipitate said polymer, there is obtained a colloidal dispersion or suspension of the polymer in the oil. The precipitated polymer is present in the form of extremely thin films having a thickness in the order of 0.1 micron and "diameters" ranging from about 1 to 100 microns. Thus the dispersion or suspension, while not a true colloid, can be accurately described as colloidal, i.e., a sol, a colloidal dispersion or suspension of a solid in a liquid.

The water-in-oil emulsion drilling fluids of the invention are remarkably stable. No phase separation has been observed upon allowing said emulsions to stand quiescent for periods of 24 hours and longer.

The following examples will serve to further illustrate the invention:

*Example I*

A water-in-oil emulsion type drilling fluid was prepared having the following composition:

| | Grams | Weight Percent |
|---|---|---|
| Water | 1,600 | 38.1 |
| Bentonite | 80 | 1.9 |
| NaCMC [1] | 2 | 0.05 |
| Diesel fuel | 2,400 | 57.1 |
| Polyethylene [3] | 80 | 1.9 |
| Calcium sulfonate [2] | 40 | 0.95 |

[1] A commercial grade of the sodium salt of carboxymethylcellulose.
[2] Commercial polymer, described below.
[3] An oil solution comprising about 50 percent by volume of calcium petroleum sulfonates prepared from solvent refined paraffinic lube oil stock as described above.

The water phase was prepared by dissolving the NaCMC in the water and then suspending the bentonite in the resulting solution. The oil phase was prepared by heating the oil to 340° F. and then dissolving the polyethylene while increasing the temperature of the oil to 380° F. The polyethylene used was a product prepared by the process of U.S. Patent 2,825,721 and had a density of 0.96 and a melt index of 5. The solution was then cooled to 200° F. before adding the calcium petroleum sulfonate. The oil solution was then cooled to room temperature (about 75° F.). The water phase suspension was added to the oil with vigorous mixing for 1 minute in a Waring Blendor. The emulsion resulting was then tested in accordnace with the API Recommended Practices Code 29, May 1957. The results of these tests are presented in the following tabulation together with the results for a control drilling fluid. The control drilling fluid was prepared by the same procedure using the same amounts of the various components except that the polyethylene was omitted.

|  | Polyethylene Drilling Fluid | Control Drilling Fluid |
|---|---|---|
| Fann viscosity at: | | |
| 600 r.p.m | 168 | 262 |
| 300 r.p.m | 100 | 179 |
| 200 r.p.m | 72 | 142 |
| 100 r.p.m | 42 | 96 |
| 2 r.p.m | 7 | |
| 1 r.p.m | 5 | |
| Apparent viscosity, cp | 84 | 131 |
| Plastic viscosity, cp | 68 | 83 |
| Yield value, lb./100 sq. ft | 32 | 96 |
| Initial gel, lb./100 sq. ft | 5 | 18 |
| 10-minute gel, lb./100 sq. ft | 5 | 33 |
| Fluid loss, ml./30 min | 3.4 | [1] 6.7 |

[1] 3.7 ml. of water and 3.0 ml. of oil.

By dilution tests of the above drilling fluids with oil and with water it was established that the polymer-containing drilling fluid was an emulsion of the water-in-oil type. The control drilling fluid, however, was an emulsion of the oil-in-water type. This is indeed a surprising result. Additional tests established that the type of emulsion obtained did no depend upon whether the oil phase was added to the water phase or the water was added to the oil phase.

A portion of the polyethylene-containing drilling fluid was examined with the electron microscope. The examination revealed that the polymer was present in the form of very thin films having a range of "diameters" from about 1 micron to about 100 microns. The film thickness appeared variable and in many cases on the order of 0.1 micron.

*Example II*

The enhanced lubricating properties of the drilling fluids of the invention are illustrated by tests on the drilling fluids of Example I with the Timken E.P. tester. Details of this apparatus and its operation have been described in "Proposed Method of Test for Measurement of Extreme Pressure Properties of Lubricants" ASTM Bulletin No. 228, pages 28–32, February 1958. For these tests the so-called OK load procedure was followed and the width of the scar on the steel test specimen was measured after a 10-minute test period except as noted. The results were as follows:

| Timken load, lb. | Scar Width in Inches when Using | |
|---|---|---|
| | Polyethylene Containing Drilling Fluid | Control Drilling Fluid |
| 2 | 0.024 | 0.036. |
| 3 | 0.027 | 0.108. |
| 4 | 0.100 | 0.190 in 3 minutes. |

The results of the above tests show many significant advantages for use of the polymer. For example, the polymer promotes formation of water-in-oil emulsions. With such emulsions, dispersion of shales or other cuttings during drilling can be substantially less than with oil-in-water emulsions. The use of the polymer gave a mud of lower fluid loss and of lower viscosity and gel strengths. As is well known, it is generally desirable to use a drilling fluid having the lowest possible fluid loss value. Finally, use of the polymer gave a drilling fluid which minimizes wear on the drill pipe, the casing, and drill bit bearings. This is clearly indicated by the Timken OK load tests.

In copending application Serial No. 764,781 filed October 2, 1958, by Charles J. Engle there is disclosed and claimed a process for combating lost circulation of drilling fluid through the wall of a bore hole into a surrounding formation penetrated by said bore hole by using polymers selected from the group consisting of polyethylene, polypropylene, copolymers of ethylene and propylene, and mixtures thereof. In the practice of said invention of said copending application said polymers are used in a granular or particulate form as compared to the colloidal dispersions of the present invention. When lost circulation materials are added to a drilling fluid to combat lost circulation, past practice has been to bypass the shale shaker or other cuttings removal device since in most instances the lost circulation material would be removed along with the cuttings removed from the drilling fluid by said shale shaker. Prior art methods do not generally permit recovery of the lost circulation material in a relatively pure form, i.e., free of cuttings and suitable for reuse.

As an added feature of the present invention and as an improvement on said invention of said copending application, I have discovered that lost circulation materials of the polymer types used in said copending application can be recovered and, by the process of the present invention, be used to prepare the water-in-oil emulsion drilling fluids of the present invention. Briefly, this added feature of the present invention comprises the removal of the granular or particulate polymers by means of a centrifugal separator such as a hydraulic cyclone, dispersing the thus recovered polymers in an oil by heating and then cooling the oil as described above, and adding an oil soluble dispersing agent to prepare the oil phase of my water-in-oil emulsion drilling fluids. Thus, this added feature of the present invention provides an improved combination process whereby said polymers used for lost circulation material can be recovered and used in forming the water-in-oil emulsion drilling fluids of the present invention.

The polymers used in the practice of the invention have a density less than that of the continuous phase of the drilling fluid and the polymer is thus recovered in the overflow stream from the hydraulic cyclone separator. Cuttings or other large solids having a density greater than that of the continuous phase of the drilling fluid are rejected in the underflow of said cyclone separator. The recovered polymer is collected and dispersed in a hydrocarbon oil as described above. The oil solution or dispersion is then added to an aqueous phase to prepare the water-in-oil emulsion drilling fluid of the present invention.

The attached drawings are schematic flow diagrams illustrating this added feature of the present invention. Referring now to FIGURE 1 of said drawings, drilling fluid (containing the granular or particulate polymer material) being returned from the well is introduced via line 10 into mud pit or tank 11. Drilling fluid from said tank 11 is passed via conduit 12, pump 13, and conduit 14 into cyclone separator 16. If desired or necessary, the drilling fluid being fed to said cyclone 16 can be diluted with water introduced via line 17. Since said polymers used as a lost circulation material have a density less than that of the continuous phase of the drilling fluid, said polymers are discharged from cyclone 16 through overflow conduit 18. Said overflow stream in conduit 18 is discharged onto an inclined screen 19 which can be of a vibrating type if desired. The screen mesh size is sufficiently small to retain practically all of the lost circulation material but is large enough to pass the fluids content in said overflow stream. The lost circulation material is discharged from screen 19 into dissolving tank 21. Oil from tank 22 is introduced into said dissolving tank 21 via conduit 23 to dissolve the polymer therein. Said tank 21 can be heated by means of coils or other suitable heating means not shown. The oil containing the dissolved polymer lost circulation material can then be passed via conduit 24 into drilling fluid blending tank 26. Said tank 21 can be equipped with a stirrer or other mixing means not shown if desired. An oil soluble dispersing agent is added to the oil containing said dissolved polymer. Said dispersing agent can be included in the oil in tank 22, added to tank 21 via conduit 20, or injected into conduit 24 via conduit 25.

A water phase is prepared separately in mixing means not shown by dissolving a water soluble stabilizing agent of a type mentioned in water. If desired, inert finely divided solids can be suspended in said solution of said stabilizing agent. Said water phase is added to said oil containing polymer and dispersing agent (oil phase) and intimately mixed therewith to form the water-in-oil emulsion drilling fluid of the invention. Said water phase can be added to said oil phase upstream of pump 42 via conduit 43 in which case pump 42 will serve to mix said phases, or said water phase can be added directly to tank 26 via conduit 44. Said tank 26 can be equipped with suitable mixing means not shown.

The underflow from cyclone 16 is discharged via conduit 27 and can be discarded via conduit 28 or returned to reserve mud pit or tank 29 via conduit 31. When employing drilling fluids containing barium sulfate or other high density weighting agents it is advantageous to recover a concentrated slurry of the weighting agent through conduit 31 for reuse in subsequent drilling operations. With unweighted drilling fluids containing abrasive sand and cuttings the underflow discharge from cyclone 16 will usually be through conduit 28 to a discard pit.

The overflow stream in conduit 18 sometimes contains, in addition to the lost circulation material, valuable mud chemicals which are dissolved or dispersed in the liquid phase. This liquid phase passes through screen 19 and into collector 32 from which it can be returned via conduits 33 and 34 to tank 36 of the drilling fluid system for subsequent use in drilling operations. If desired said liquid can of course be discarded via conduit 37.

The above is a brief description of the principal aspects of this added feature of the present invention. However, those skilled in the art will recognize there are other embodiments. Generally, this feature of the invention will be practiced with drilling fluids of the water base or oil-in-water emulsion types. In another embodiment of this added feature of the present invention the lost circulation material which is discharged from screen 19 can be sent to a suitable washer or a combination washer-dryer. Thus, the lost circulation material can be washed with water and then dried before discharging into dissolver tank 21.

Still another embodiment of said added feature of the invention is illustrated in FIGURE 2. In this system two cyclones in series are used. In this system the first cyclone 16' is operated under conditions so as to effect removal of cuttings and abrasive sand via conduit 27'. The overflow from said cyclone 16' is passed into a second cyclone 41 from which the overflow and underflow streams are processed as described in connection with FIGURE 1. All other elements in FIGURE 2 are like those in FIGURE 1.

The above described added feature of the present invention is particularly suitable for use when the lost circulation material is a high density (0.94 to 1.0 grams per cc.) polymer of ethylene.

*Example III*

A 10 gram sample of a 20–40 mesh polyethylene prepared over a chromium oxide catalyst and having a density of about 0.96 was admixed with an aqueous suspension of bentonite containing about 3 weight percent bentonite. The resulting admixture was charged to a small hydraulic cyclone separator having a diameter of 0.6 inch and a length of 3.6 inches. The diameters of the overflow and underflow ports of said cyclone were 0.2 and 0.1 inch respectively and the charge pressure was 18 p.s.i.g.

The overflow stream and the underflow stream were each collected, filtered through a 60-mesh screen, and the polymer from each stream dried and weighed. It was found that 97.2 weight percent of the polymer charged to said cyclone was recovered in said overflow stream.

While certain embodiments of the invention have been described for illustrative purposes the invention obviously is not limited thereto. Various other modifications will be apparent to those skilled in the art in view of this disclosure. Such modifications are within the spirit and scope of the invention.

I claim:

1. A well servicing fluid comprising a water-in-oil emulsion containing a water soluble stabilizing agent, a polymer selected from the group consisting of polyethylene, polypropylene, copolymers of ethylene and propylene, and mixtures thereof colloidally dispersed in the oil phase of said emulsion, and an oil soluble dispersing agent.

2. The well servicing fluid of claim 1 wherein said polymer is polyethylene.

3. The well servicing fluid of claim 1 wherein said polymer is polypropylene.

4. The well servicing fluid of claim 1 wherein said polymer is a copolymer of ethylene and propylene.

5. A well servicing fluid comprising a water-in-oil emulsion containing finely divided inert solids, a water soluble stabilizing agent, a polymer selected from the group consisting of polyethylene, polypropylene, copolymers of ethylene and propylene, and mixtures thereof colloidally dispersed in the oil phase of said emulsion, and an oil soluble dispersing agent.

6. A well servicing fluid comprising a mixture of: sufficient water-in-oil emulsion to maintain said mixture fluid; sufficient finely divided inert solids to form a filter cake on the wall of the well; an amount of a water soluble stabilizing agent sufficient to stabilize said emulsion; an amount of a polymer selected from the group consisting of polyethylene, polypropylene, copolymers of ethylene and propylene, and mixtures thereof sufficient to enhance the lubricating properties and to decrease the fluid loss due to filtration of said well servicing fluid through said filter cake without increasing the viscosity of said well servicing fluid to such an extent that it cannot be circulated, said polymer being colloidally dispersed in the oil phase of said emulsion; and a sufficient amount of an oil soluble dispersing agent to maintain said polymer dispersed in the oil phase of said emulsion.

7. A water-in-oil emulsion type well servicing fluid comprising: from about 9 to about 45 weight percent water; from about 42 to about 89 weight percent oil; from about 3.5 to about 18.5 pounds per barrel of said water of inert finely divided solids; from about 0.2 to about 1 pound per barrel of said water of a water soluble stabilizing agent; from about 3 to about 76.5 pounds per barrel of said oil of a polymer selected from the group consisting of polyethylene, polypropylene, copolymers of ethylene and propylene, and mixtures thereof colloidally dispersed in said oil; and from about 2.5 to about 10 pounds per barrel of said oil of an oil soluble dispersing agent.

8. A well servicing fluid comprising a stable water-in-oil emulsion containing from about 9 to about 45 weight percent water, from about 42 to about 89 percent of oil, from about 0 to about 2.5 weight percent of inert finely divided solids, from about 0.005 to about 0.13 weight percent of a water soluble stabilizing agent, from about 0.45 to about 19 weight percent of a polymer selected from the group consisting of polyethylene, polypropylene, copolymers of ethylene and propylene, and mixtures thereof colloidally dispersed in said oil, and from about 0.3 to about 3 weight percent of an oil soluble dispersing agent.

9. A method for producing a water-in-oil emulsion adapted for use as a circulating fluid in rotary well drilling, which method comprises: separately forming an aqueous phase by preparing a dilute aqueous solution of a water soluble stabilizing agent; separately forming an oil phase by dispersing an oil soluble dispersing agent and a polymer selected from the group consisting of polyethylene, polypropylene, copolymers of ethylene and propylene, and mixtures thereof in an oil, said polymer being dispersed in said oil by heating said oil to a temperature sufficient to dissolve said polymer and then cooling the resulting solution to a temperature sufficient to precipitate substantially all of said polymer as a colloidal dispersion in said oil; and thereafter intimately mixing said aqueous phase with said oil phase to form said water-in-oil emulsion.

10. The method of claim 9 wherein said polymer is polyethylene.

11. The method of claim 9 wherein said polymer is polypropylene.

12. The method of claim 9 wherein said polymer is a copolymer of ethylene and propylene.

13. A method for producing a water-in-oil emulsion adapted for use as a circulating fluid in rotary well drilling, which method comprises: separately forming an aqueous phase by preparing a dilute aqueous solution of a water soluble stabilizing agent having finely divided inert solids suspended therein; separately forming an oil phase by dispersing an oil soluble dispersing agent and a polymer selected from the group consisting of polyethylene, polypropylene, copolymers of ethylene and propylene, and mixtures thereof in an oil, said polymer being dispersed in said oil by heating said oil to a temperature sufficient to dissolve said polymer and then cooling the resulting solution to a temperature sufficient to precipitate substantially all of said polymer as a colloidal dispersion in said oil; and thereafter intimately mixing said aqueous phase with said oil phase to form said water-in-oil emulsion.

14. A method for producing a water-in-oil emulsion adapted for use as a circulating fluid for rotary well drilling, which method comprises: separately forming an aqueous phase containing from about 0.2 to about 1 pound per barrel of water of a water soluble stabilizing agent, and having from about 3.5 to about 18.5 pounds per barrel of water of inert finely divided solids suspended therein; separately forming an oil phase by dispersing from about 3 to about 76.5 pounds per barrel of oil of a polymer selected from the group consisting of polyethylene, polypropylene, copolymers of ethylene and propylene, and mixtures thereof, and from about 2.5 to about 10 pounds per barrel of oil of an oil soluble dispersing agent in an oil, said polymer being dispersed in said oil by heating said oil to a temperature sufficient to dissolve said polymer and then cooling the resulting solution to a temperature sufficient to precipitate substantially all of said polymer as a colloidal dispersion in said oil; and thereafter intimately mixing said aqueous phase and said oil phase in amounts such that the final mixture contains from about 10 to about 45 weight percent water phase and from about 55 to about 90 percent oil phase.

15. In a process for the drilling of a well with well drilling tools wherein there is circulated in said well a well drilling fluid, the improvement comprising circulating in said well as said drilling fluid a water-in-oil emulsion containing finely divided inert solids, a water soluble stabilizing agent, a polymer selected from the group consisting of polyethylene, polypropylene, copolymers of ethylene and propylene, and mixtures thereof colloidally dispersed in the oil phase of said emulsion, and a dispersing agent for maintaining said polymer dispersed in the oil phase of said emulsion.

16. A process of drilling a well with a rotary bit which comprises forming a bore hole with said bit while circulating through said bit and through said bore hole in contact with the walls thereof a drilling fluid having reduced fluid loss properties and enhanced lubricating properties, said drilling fluid comprising a water-in-oil emulsion containing finely divided inert solids, a water soluble stabilizing agent, a polymer selected from the group consisting of polyethylene, polypropylene, copolymers of ethylene and propylene, and mixtures thereof colloidally dispersed in the oil phase of said emulsion, and a dispersing agent for maintaining said polymer dispersed in the oil phase of said emulsion.

17. In a process for the drilling of a well with well drilling tools comprising a rotary bit and wherein there is circulated in said well through said bit and in contact with the wall of said well a well drilling fluid, the improvement comprising circulating in said well as said drilling fluid a water-in-oil emulsion comprising: from about 9 to about 45 weight percent water; from about 42 to about 89 weight percent oil; from about 3.5 to about 18.5 pounds per barrel of said water of inert finely divided solids; from about 0.2 to about 1 pound per barrel of said water of a water soluble stabilizing agent; from about 3 to about 76.5 pounds per barrel of said oil of a polymer selected from the group consisting of polyethylene, polypropylene, copolymers of ethylene and propylene, and mixture thereof colloidally dispersed in said oil; and from about 2.5 to about 10 pounds per barrel of said oil of an oil soluble dispersing agent.

18. In a process for the drilling of a well with well drilling tools comprising a rotary bit and wherein there is circulated in said well through said bit and along the wall of the bore hole a well drilling fluid having incorporated therein particulate particles of a polymer selected from the group consisting of polyethylene, polypropylene, copolymers of ethylene and propylene, and mixtures thereof as a lost circulation material for combating lost circulation of said drilling fluid into a surrounding formation penetrated by said bore hole, and said drilling fluid is returned to the surface, and wherein when said lost circulation material is no longer needed, the improvement comprising, in combination, the steps of: passing said returned drilling fluid through a hydraulic cyclone separation zone; separating said particles of polymer from the overflow stream from said hydraulic cyclone separation zone; passing said separated particles of polymer to a dissolving zone and therein dispersing said separated polymer into an oil to form an oil phase by heating said oil to a temperature sufficient to dissolve said polymer and then cooling the resulting solution to a temperature sufficient to precipitate substantially all of said polymer as a colloidal dispersion in said oil; adding an oil soluble dispersing agent to said oil phase; separately forming an aqeuous phase by preparing a dilute aqueous solution of a water soluble stabilizing agent; and intimately mixing said oil phase and said aqueous phase to form a stable water-in-oil emulsion well drilling fluid having improved fluid loss properties and enhanced lubricating properties.

19. In a process for the drilling of a well with well drilling tools comprising a rotary bit and wherein there is circulated in said well through said bit and along the wall of the bore hole a well drilling fluid having incorporated therein particulate particles of a polymer selected from the group consisting of polyethylene, polypropylene, copolymers of ethylene and propylene, and mixtures thereof as a lost circulation material for combating lost circulation of said drilling fluid into a surrounding formation penetrated by said bore hole, and said drilling fluid is returned to the surface, and wherein when said lost circulation material is no longer needed, the improvement comprising, in combination, the steps of: passing said returned fluid through a first hydraulic cyclone separation zone; discarding the underflow stream from said first hydraulic separation zone containing a concentration of the coarse sand and cuttings contained in said returned drilling fluid; passing the overflow stream from said first hydraulic cyclone separation zone through a second hydraulic separation zone; separating said particles of polymer from the overflow stream from said second hydraulic separation zone; passing said separated particles of polymer to a dissolving zone and therein dispersing said separated polymer into an oil to form an oil phase by heating said oil to a temperature sufficient to dissolve said polymer and then cooling the resulting solution to a temperature sufficient to precipitate substantially all of said polymer as a colloidal dispersion in said oil; adding an oil soluble dispersing agent to said oil phase; separately forming an aqueous phase by preparing a dilute aqueous solution of a water soluble stabilizing agent having finely divided inert solids suspended therein; intimately blending said oil phase and said aqueous phase in a mixing zone to form a stable water-in-oil emulsion well drilling fluid having improved fluid loss properties and enhanced lubricating properties; and returning said water-in-oil emulsion well drilling fluid to said well as a replacement for said first mentioned well drilling fluid.

20. A well servicing fluid comprising a stable water-in-oil emulsion containing: (1) from about 9 to about 45 weight percent water; (2) from about 0 to about 2.5 weight percent of finely divided bentonite; (3) from about 0.005 to about 0.13 weight percent of sodium carboxymethylcellulose; (4) from about 42 to about 89 weight percent of Diesel fuel: (5) from about 0.45 to about 19 weight percent of polyethylene colloidally dispersed in said diesel fuel; and (6) from about 0.3 to about 3 weight percent of calcium sulfonate; and wherein the total amount of said ingredients (1), (2), and (3) is at least 10 weight percent and not more than 45 weight percent, and the total amount of said ingredients (4), (5), and (6) is at least 55 weight percent and not more than 90 weight percent.

21. In a process for the drilling of a well with well drilling tools comprising a rotary bit and wherein there is circulated in said well through said bit and along the wall of the bore hole a well drilling fluid having incorporated therein particulate particles of a polymer selected from from the group consisting of polyethylene, polypropylene, copolymers of ethylene and propylene, and mixtures thereof as a lost circulation material for combating lost circulation of said drilling fluid into a surrounding formation penetrated by said bore hole, and said drilling fluid is returned to the surface, and wherein when said lost circulation material is no longer needed, the improvement comprising, in combination, the steps of: passing said returned drilling fluid through a hydraulic cyclone separation zone; separating said particles of polymer from the overflow stream from said hydraulic cyclone separation zone; passing said separated particles of polymer to a dissolving zone and therein colloidally dispersing said separated polymer into an oil containing an oil soluble dispersing agent to form an oil phase; adding an oil soluble dispersing agent to said oil phase; separately forming an aqueous phase by preparing a dilute aqueous solution of a water soluble stabilizing agent; and intimately mixing said oil phase and said aqueous phase to form a stable water-in-oil emulsion well drilling fluid having improved fluid loss properties and enhanced lubricating properties.

References Cited in the file of this patent

UNITED STATES PATENTS

| | | |
|---|---|---|
| 2,661,334 | Lummus | Dec. 1, 1953 |
| 2,702,787 | Freeland | Feb. 22, 1955 |
| 2,712,355 | Hoff | July 5, 1955 |
| 2,912,380 | Groves | Nov. 10, 1959 |
| 2,919,898 | Marwil et al. | Jan. 5, 1960 |
| 3,057,797 | Anderson et al. | Oct. 9, 1962 |

FOREIGN PATENTS

| | | |
|---|---|---|
| 579,183 | Canada | July 7, 1959 |